1,702,617

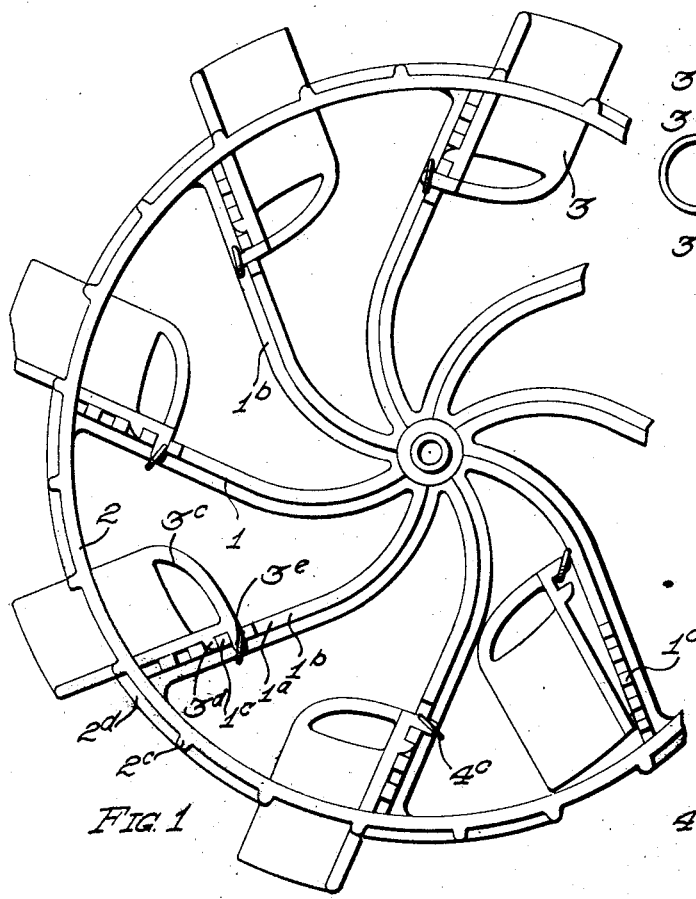
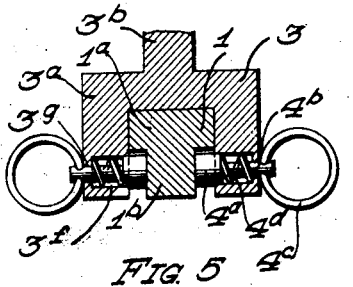
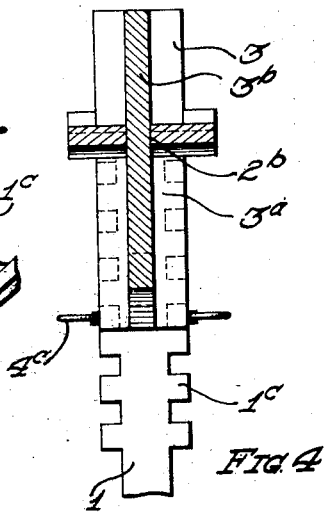
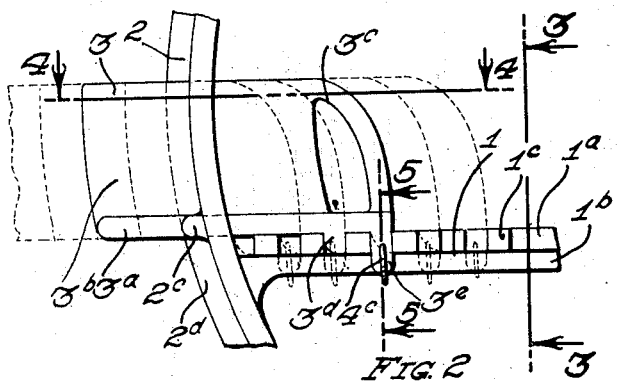
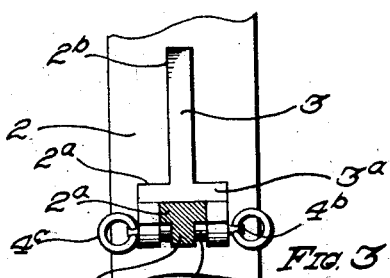
INVENTOR.
PHILIP PFEIFER
BY A. B. Bowman
ATTORNEY Patented Feb. 19, 1929.

UNITED STATES PATENT OFFICE.

PHILIP PFEIFER, OF SAN DIEGO, CALIFORNIA.

TRACTOR WHEEL WITH ADJUSTABLE LUG.

Application filed February 2, 1927. Serial No. 165,267.

My invention relates to tractor wheels, more particularly to tractor wheels which have adjustable traction lugs, and the objects of my invention are: first, to provide a wheel of this class in which the lugs may be quickly and readily adjustable for depth; second, to provide a wheel of this class which may be quickly and easily changed without the use of tools; third, to provide a device of this class which eliminates the need of extra wheels for tractors; fourth, to provide a device of this class which is particularly adapted for garden tractors; fifth, to provide a wheel of this class which is narrow in accordance with its efficiency; sixth, to provide a device of this class which is adaptable for sandy, boggy or firm ground; seventh, to provide a device of this class in which the adjustable traction lugs are inclined relative to the rim of the wheel for the purpose of increasing the available tractions, and eighth, to provide a device of this class which is simple and economical of construction, convenient, simple, easy to adjust, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a fragmentary side elevational view of my tractor wheel with several of the lugs shown in operative position thereon; Fig. 2 is an enlarged fragmentary elevational view thereof, showing a portion of rim, spoke and lug and showing the lug in various positions by dotted lines; Fig. 3 is a sectional view through 3—3 of Fig. 2; Fig. 4 is a sectional view through 4—4 of Fig. 2, and Fig. 5 is a still further enlarged cross-sectional view through 5—5 of Fig. 2.

Similar characters of reference refer to similar parts and portions throughout the several views of the drawings.

The hub and spoke member 1, rim member 2, tractor lug members 3, and clamp plunger member 4, constitute the principal parts and portions of my tractor wheel.

The spokes 1 join each other at the hub and are T-shaped in cross-section with a cross portion $1^a$ and a rib portion $1^b$. They are curved near the hub, but when midway between the hub and rim, extend tangentially to the curve until they meet the rim at an angle with the radius of the wheel. Positioned on the straight tangential portions of the spokes are a plurality of lugs $1^c$, which engage portions of the tractor lug 3. The rim 2 is provided with a plurality of T-shaped slots with a cross portion $2^a$ and a leg portion $2^b$. The rim is also provided with small tractor lug portions $2^c$ positioned crossways on the rim and a guide lug $2^d$, which extends longitudinally with the rim. The tractor lug 3 is T-shaped in cross-section with a cross portion $3^a$ and a leg portion $3^b$. The cross portion $3^a$ of the tractor lug rests on the cross portion $1^a$ of the spoke and fits in the slot $2^a$ of the rim. The leg portion $3^b$ extends in the opposite direction to the leg portion $1^b$ and fits in the slot $2^b$ of the rim and serves as a guide member to prevent the wheel from slipping sideways, as shown best in Figs. 3 and 4 of the drawings. The leg portion $3^b$ is rounded at the end towards the hub of the wheel, is provided with a slot $3^c$, and serves as a handle for moving it. The tractor lug is also provided with two lug portions $3^d$, which straddle the cross portion $1^a$ and fit between the lugs $1^c$ of the spoke 1. At the extremity of the hub end of the tractor lug 3 are two lugs $3^e$, which are longer than the lugs $3^d$ and are provided with inwardly extending, annular holes $3^f$ constricted at $3^g$. These holes house a plunger 4, which consists of a plunger portion $4^a$ with a shaft $4^b$ extending outwardly through the constricted portion $3^g$ and adapted to receive a ring $4^e$, which keeps the spring $4^d$ from forcing the plunger inwardly too far. The ring also serves as a handle for pulling the plunger outwardly from the spoke when it is desired to adjust the tractor lug.

To adjust the tractor lug, the plungers $4^a$ are pulled outwardly from the leg portion $1^a$ and the tractor lug tilted outwardly from the spoke until the lugs $3^d$ and $3^e$ disengage the lug $1^c$. Then the tractor lug is moved outwardly or inwardly until in the desired position, as shown by the various dotted positions in Fig. 2 of the drawings. The tractor lug is then tilted backwardly toward the spoke 1 until the lugs $3^d$ and $3^e$ are slipped between the lugs $1^c$ and the plunger 4 is then released. The tractor lug is then ready for use. If it is desired to remove the tractor lug, it is slipped toward the hub until it ceases to engage the slotted portions of the rim and it then may be removed.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. A device of the class described, including a wheel with a plurality of spokes provided with axially extending lugs, a rim at the ends of said spokes with a plurality of apertures, a plurality of traction lugs adjustably mounted on said spokes and extending through said apertures in said rim, means for readily readjusting and locking said traction lugs in relation to said rim, said means consisting of a pair of spaced apart lugs on each of said traction lugs adapted to fit between said lugs on both sides of a spoke of said wheel, a plunger means partly enveloping each of said spokes for retaining said lugs in position, and spring means for holding said plunger means in normally extended position.

2. In a device of the class described, a rim provided with a plurality of apertures therein, a plurality of spokes secured at their outer ends to said rim adjacent said apertures, the outer portions of said spokes being straight and inclined with respect to the rim, a plurality of axially extending lugs on both sides of each of said outer spoke portions, traction members adapted to extend through said apertures and provided with rearwardly extending lugs on their inner end portions adapted to rest on the lugs on said spokes and secure said traction members in radially adjustable position and substantially parallel with said outer spoke portions, and means for releasably locking said traction members against displacement relative to said rim.

3. In a device of the class described, a rim provided with a plurality of apertures therein, spokes secured at their outer ends to said rim, adjacent said apertures, each of said spokes having a plurality of axially extending, equally spaced lugs on both sides of its outer end, traction members adapted to extend through said apertures and rest against the fronts of said spokes, each of said traction members having rearwardly extending lugs adapted to project between adjacent lugs on a spoke and support said traction member thereon, a pair of arms projecting on both sides of said spoke member and releasable locking means associated with said arms and extending rearwardly of said spoke for locking said traction member in position relative to said rim.

In testimony whereof, I have hereunto set my hand at San Diego, California, this 22nd day of January, 1927.

PHILIP PFEIFER.